United States Patent [19]

Fukuda et al.

[11] 4,293,201
[45] Oct. 6, 1981

[54] RUBBER-PADDED FRAMES OF EYE SPECTACLES AND METHOD FOR PREPARING SAME

[75] Inventors: Takeshi Fukuda, Annaka; Tomiyoshi Tutida, Takasaki, both of Japan

[73] Assignee: Shin-Etsu Chemical Co., Ltd., Tokyo, Japan

[21] Appl. No.: 129,901

[22] Filed: Mar. 13, 1980

[30] Foreign Application Priority Data

Mar. 22, 1979 [JP] Japan ................................. 54-33616

[51] Int. Cl.³ .......................... G02C 5/12; G02C 5/16; G02C 13/00
[52] U.S. Cl. .................................. 351/178; 351/122; 351/139
[58] Field of Search ...................... 351/122, 139, 178; 264/343

[56] References Cited

U.S. PATENT DOCUMENTS

| | | | |
|---|---|---|---|
| 2,271,454 | 1/1942 | Erdle et al. | 264/343 |
| 3,615,966 | 10/1971 | Ljungbo | 264/343 X |
| 3,993,403 | 11/1976 | Brown | 351/178 |
| 4,141,941 | 2/1979 | Travnicek | 264/342 R X |

FOREIGN PATENT DOCUMENTS

| | | | |
|---|---|---|---|
| 2723538 | 12/1978 | Fed. Rep. of Germany | 351/139 |
| 2396983 | 3/1979 | France | 351/122 |

*Primary Examiner*—John K. Corbin
*Assistant Examiner*—Scott J. Sugarman
*Attorney, Agent, or Firm*—Toren, McGeady & Stanger

[57] ABSTRACT

The invention proposes a novel method for providing a covering pad member of silicone rubber to a frame of spectacles on the portions coming into contact with the human body of the wearer of the spectacles, such as the side pieces and the nose pads. According to the inventive method, a shaped member of the silicone rubber having dimensions somewhat smaller than the portion to be covered therewith is first swelled with an orgnosilicon compound having volatility, inserted to the portion, e.g. sidepiece, and then dried by evaporation of the organosilicon compound as the swelling agent whereby the member shrinks to fit the portion of the frame tightly. Organosilicon compounds, e.g. hexamethyldisiloxane, are recommended owing to the physiological inertness to human body as well as owing to the absence of aggressiveness to the plastic part used in the frames of spectacles causing no damage to the beautiful appearance of the frame even in an inadvertent contact.

3 Claims, No Drawings

RUBBER-PADDED FRAMES OF EYE SPECTACLES AND METHOD FOR PREPARING SAME

BACKGROUND OF THE INVENTION

The present invention relates to an improved rubber-padded frame of eye spectacles or, more particularly, to a frame of spectacles padded with members of a silicone rubber on portions where the frame is in contact with the human body of the wearer and a method for preparing the same.

When spectacles are worn by a wearer, the frame of the spectacles is usually hung on the ears of the wearer by the sidepieces and, in the same time, it is supported by the upper portion of the nose at the nose pads of the frame. Accordingly, much of optician's skill is required not only in the optics of the glasses per se but also in fitting the frame to the wearer's face because otherwise the wearer feels a great deal of unpleasantness or uncomfortableness in continued wearing of the spectacles. For example, too tight fitting of the frame to the wearer's face sometimes causes pains in his ears and nose while too loose fitting is undesirable because the spectacles often slide down out of the proper position, especially, with perspiration in hot weathers.

Thus, not only opticians but also wearers of spectacles encounter difficult problems in obtaining comfortable feeling in wearing spectacles.

An attempt to solve such a problem is to provide the frame with padding members of rubber on the portions where the frame comes into contact with the body of the wearer. That is, the frame is provided with covering pads made of a rubbery material on the nose pads and the sidepieces where the frame comes into contact with the nose and the ears of the wearer, respectively. One of the difficulties in providing such covering pads on the nose pads and the sidepieces of a frame of spectacles is that the nose pads and the sidepieces of a frame have usually very irregular forms so that good fitting of the rubber covering is hardly obtained with the nose pads or sidepieces as the substrates. For example, many of the sidepieces have a larger width at the end portions thereof than at the middle portions so that mere insertion of a plain rubber tube to the side piece cannot give a good result when a tightly covering rubber layer is desired on the sidepiece in consideration of the appearance of the frame.

SUMMARY OF THE INVENTION

It is therefore an object of the present invention to provide a frame of spectacles having rubber pads on the portions thereof coming into contact with the body of the wearer without adverse effect on the appearance of the frame.

Another object of the invention is to provide an improved frame of spectacles having covering pads of a silicone rubber on the nose pads and the sidepieces tightly fitting thereto.

Further object of the invention is to provide a novel method for providing such covering pads of a silicone rubber on the nose pads and sidepieces of a frame of spectacles.

According to the invention, a shaped member of a silicone rubber having dimensions somewhat smaller than the dimensions of the nose pad or sidepiece of the frame to be covered with the covering pads is first swollen with a swelling agent, then inserted to the nose pad or the sidepiece to cover it and finally subjected to evaporation of the swelling agent so as that the silicone rubber member is dried and shrunk to tightly fit the nose bad or the sidepiece.

In particular, there is recommended the use of a low molecular weight organosilicon compound as the swelling agent.

DETAILED DESCRIPTION OF THE PREFERRED EMBODIMENTS

It is of course that the form of the shaped member of a silicone rubber depends on whether the member is used to cover a nose pad or a side piece of a frame of spectacles. Thus, a bag-like shaped member is suitable for covering a nose pad of a frame while a sidepiece of a frame is most conveniently covered with a tubular shaped member with an open end or closed end. At any rate, the shaped member of a silicone rubber is shaped to have dimensions somewhat smaller than the dimensions of the nose pad or sidepiece to be covered therewith so as that tight fitting is obtained.

Silicone rubbers are particularly preferred to the other kinds of synthetic or natural rubbers because (1) a silicone rubber can have a hardness ranging in a wide range so that the hardness of the silicone rubber can be selected to just comply with the wearer's preference, (2) the surface of silicone rubbers is less slippery on the human skin when wet with sweat than the other kinds of rubbers and good feeling is obtained in wearing, (3) silicone rubbers are generally physiologically inert and safe from skin irritation or contact dermatitis even in continued contact with human skin, and (4) transparent silicone rubbers are readily obtained so that the appearance of the frame is not affected adversely.

The thickness of the shaped member of the silicone rubber is not particularly limitative but it is preferably in the range from 0.1 to 5 mm or, more preferably, from 0.3 to 2 mm so as that a sufficient padding effect is obtained. The hardness of the silicone rubber is also of some importance in order to give comfortable feeling to the wearer. The hardness should be in the range from 15 to 90 or, preferably, 30 to 70 by the JIS scale.

The next step is swelling of the silicone rubber shaped member with a suitable swelling agent. Numbers of organic solvents are known as a swelling agent for silicone rubbers but preferred swelling agents in this case should have adequate volatility so as that rapid drying and shrinkage of the member after insertion to the nose pad or sidepiece can be ensured.

The organic solvents suitable as a swelling agent for silicone rubbers are exemplified by aromatic hydrocarbon solvents such as benzene, toluene and xylene and halogenated hydrocarbons such as carbon tetrachloride, trichloroethylene, perchloroethylene and the like. The swelling agent has a boiling point, preferably, in the range from 20° to 200° C. as a measure of the volatility.

The silicone rubber shaped member becomes readily swollen when it is dipped in the swelling agent at room temperature for a time of, for example, 3 minutes or longer to reach a swelling equilibrium. When the swelling ratio at the swelling eauilibrium is too large, the ratio can be adjusted by use of a swelling agent which is a mixture of the above named swelling solvents and a non-swelling solvent in an appropriate proportion. It is recommended that the equilibrium swelling ratio is in the range from 105 to 600% by weight. This is because too small swelling ratios lead to a difficulty in inserting the shaped member to the nose pad or sidepiece or loose fitting after drying and shrinkage while too large swelling ratios are undesirable due to the excessively long time taken for drying and shrinkage after insertion of the member to the substrate.

The above named aromatic hydrocarbon solvents and halogenated hydrocarbon solvents are quite satisfactory in so far as the swelling and drying performance is concerned. However, they are undesirable in several points. For example, these solvents are aggressive to the materials usually used in the frames of spectacles. It is very conventional that at least part of the frames are formed of a plastic material such as cellulosic plastics which are readily attacked by the above named solvents causing whitening on the surface. Therefore, the silicone rubber shaped member swollen with these solvents must be kept away from the parts of plastics other than the nose pads or sidepieces to be covered therewith. Otherwise the beautiful appearance of the frames is greatly reduced.

In addition, the above named solvents are more or less toxic to the human body so that their use is undesirable, especially, when a large volume of the solvent is to be handled.

In view of the above problems in the use of the conventional solvents for swelling the silicone rubber shaped members, the inventors have conducted extensive investigations to obtain a swelling solvent suitable for the purpose with no adverse effect on the plastic material of the frame as well as with no problem on the human health.

The above investigations have arrived at a discovery that certain kinds of low molecular weight organosilicon compounds are the most suitable as a swelling agent of the silicone rubber shaped members as a covering pad of frames of spectacles. They are not only physiologically inert to human body but also not aggressive to the materials of which the frame is formed. In addition, the swellability and volatility can be adjusted as desired by properly choosing the compounds or by using a mixture of two or more of organosilicon compounds having different swellability and volatility.

The organosilicon compounds suitable for the purpose are organosilane compounds or organopolysiloxane compounds represented by the general formula $$R^1_a Y_b SiO_{4-a-b/2},\qquad (I)$$

where $R^1$ is a hydrogen atom or a substituted or unsubstituted monovalent hydrocarbon group, Y is a hydroxy group or a hydrolyzable group, a is a positive number not exceeding 4 and b is zero or a positive number not exceeding 4 with the proviso that a+b is a positive number not exceeding 4. When a+b is equal to 4, the compound is an organosilane represented by the general formula $R^1_a SiY_{4-a}$ while the compound is an organopolysiloxane when a+b is smaller than 4. The organosilicon compound should desirably have a boiling point in the range from 20° to 200° C. because a compound having a too low boiling point is difficult to handle and no sufficient swelling ratio is obtained while an organosilicon compound having a boiling point higher than 200° C. is undesirable due to the low velocity of vaporization when the swollen silicone rubber is to be dried.

In the above given general formula (I), $R^1$ is exemplified by alkyl groups such as methyl, ethyl and propyl groups, preferably, methyl group, aryl groups such as phenyl and tolyl groups, preferably, phenyl group, and alkenyl groups such as vinyl and allyl groups, preferably, vinyl group. Those groups derived from the above named hydrocarbon groups by the substitution of halogen atoms or other substituent groups for part or all of the hydrogen atoms in the hydrocarbon groups are also suitable.

The group Y in the general formula (I) is a hydroxy group or a hydrolyzable group exemplified by alkoxy groups such as methoxy, ethoxy and propoxy groups, acyloxy groups such as acetoxy and propoxy groups, amino group and substituted amino groups, aminoxy group and substituted aminoxy groups, ketoxime groups, amido groups and alkenyloxy groups. However, such a hydroxy or hydrolyzable group is not essential in the organosilicon compounds.

Several of the examples of the above defined organosilicon compounds are as follows: tetramethylsilane; trimethylethylsilane; trimethylvinylsilane; trimethyl perfluoropropylsilane; trimethylmethoxysilane; trimethylethoxysilane; dimethyldimethoxysilane; vinyl trimethoxysilane; trimethyl silanol; perfluoropropyl trimethoxysilane and a silacyclo compound expressed by the formula

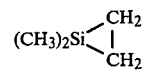

as the examples of the organosilane compounds and hexamethyldisiloxane; 1,1,3,3-tetramethyldisiloxane; 1,3-dimethyldisiloxane; 1,1,1,3,3-pentamethyldisiloxane; 1,1,3,3-tetramethyl-1,3-divinyldisiloxane; octamethyltrisiloxane; 1,3,5-trimethylcyclotrisiloxane; octamethylcyclotetrasiloxane and 1,3,5,7-tetramethylcyclotetrasiloxane as the examples of the organopolysiloxane compounds.

In addition, several kinds of silalkylene compounds and silazane compounds are also used as a kind of substituted alkylcontaining organosilane compounds or substituted amino-containing organosilane compounds. Examples of these compounds are bis(trimethylsilyl) methane and hexamethyldisilazane.

Among the above named organosilicon compounds, the most preferred is hexamethyldisiloxane owing to its adequate swelling performance and moderate vaporization velocity with a boiling point of about 100° C. along with its inexpensiveness. It is, however, optional to use a mixture of two kinds or more of the organosilicon compounds, if desired, with an object of controlling the swelling and drying performance. It is further optional that the organosilicon compounds is admixed or diluted with an organic solvent miscible therewith according to need to increase or decrease the swelling ratio of the silicone rubber shaped members.

The time taken for swelling and the equilibrium swelling ratio of the silicone rubber shaped members are largely dependent on the kind of the swelling agent and the grade of the silicone rubber or, particularly, on the degree of crosslinking of the silicone rubber. As a general measure, however, 24 hours of dipping at room temperature is sufficient in most cases to obtain equilibrium swelling to give an equilibrium swelling ratio by weight of 105 to 500% for the organosilicon compounds. Further, the time taken for complete evaporation of the swollen silicone rubber shaped member also depends largely on the kind of the swelling agent to be evaporated but a silicone rubber member swollen with hexamethyldisiloxane is completely dry within about 10 minutes when exposed to open air.

It is further noteworthy that a silicone rubber member once swollen with an organosilicon compound regains its original dimensions and mechanical properties when it is completely dried. In this connection, several experiments were undertaken to demonstrate the reversibility of the dimensions and mechanical properties of silicone rubber members by swelling and drying.

Thus, tubular specimens of a cured silicone rubber were prepared by cutting a continuous length silicone rubber tube having an inner diameter of 1.20 cm obtained by extrusion molding of a silicone rubber stock (KT 120R, a product by Shin-Etsu Chemical Co., Japan). The individual tubular specimens had a length of 2.50 to 2.51 cm and a weight of 2.03 to 2.04 grams. The tubular specimens were each dipped in an organosilicon compound given in Table 1 below at 20° C. for 24 hours and the dimensions and the weight of each specimen were recorded. Thereafter, the swollen specimens were exposed to open air at 20° C. for 3 hours to be completely dry and the dimensions and the weight were again determined. The results are summarized in Table 1.

TABLE 1

| Swelling agent | As swollen | | | After drying | | |
|---|---|---|---|---|---|---|
| | Length, cm | Inner diameter, cm | Weight, g | Length, cm | Inner diameter, cm | Weight, g |
| Trimethylvinylsilane | 3.78 | 1.81 | 5.51 | 2.51 | 1.20 | 2.04 |
| Trimethylmethoxysilane | 3.86 | 1.85 | 6.20 | 2.50 | 1.20 | 2.03 |
| Dimethyldimethoxysilane | 3.79 | 1.81 | 6.29 | 2.51 | 1.20 | 2.04 |
| Vinyltrimethoxysilane | 3.52 | 1.69 | 4.70 | 2.51 | 1.20 | 2.04 |
| Hexamethyldisiloxane | 3.74 | 1.80 | 5.83 | 2.50 | 1.20 | 2.03 |
| 1,3,5-Trimethylcyclotrisiloxane | 3.75 | 1.79 | 6.83 | 2.52 | 1.21 | 2.06 |
| Bis(trimethylsilyl)methane | 3.71 | 1.78 | 5.48 | 2.50 | 1.20 | 2.03 |
| Hexamethyldisilazane | 3.81 | 1.83 | 6.03 | 2.53 | 1.21 | 2.08 |

Further, a cured silicone rubber sheet having a thickness of 2 mm prepared with a silicone rubber stock (KE 556, a product by Shin-Etsu Chemical Co., Japan) was cut into dumbell-shaped test specimens of No. 2 as specified in JIS K 6301 and the test specimens were subjected to swelling by dipping in hexamethyldisiloxane or trimethylmethoxysilane at room temperature for 72 hours. The thus swollen test specimens were then exposed to open air at 20° C. for 3 hours to complete dryness and the mechanical strengths of the dried specimens were determined to give the results set out in Table 2 below together with the data for the specimens before swelling.

TABLE 2

| Swelling agent | Hardness (JIS) | Elongation at break, % | Tensile strength, kg/cm$^2$ |
|---|---|---|---|
| No swelling | 54 | 370 | 85 |
| Hexamethyldisiloxane | 54 | 375 | 84 |
| Trimethylmethoxysilane | 54 | 395 | 86 |

Thus, it is self-evident that, when the sidepieces or nose pads of a frame of spectacles are covered with a tubular or bag-like shaped member of cured silicone rubber swollen with the above specified organosilicon compound and then dried, The silicone rubber member shrinks to fit the sidepiece or nose pad so tightly that cannot be expected by mere insertion of a dry silicone rubber member to the sidepiece or nose pad to give a padding comfortable to the wearer of the spectacles even by continued wearing with no adverse effect on the beautiful appearance of the frame.

What is claimed is:

1. A method for providing a covering pad member of a silicone rubber on to a portion of a frame of eye spectacles coming into contact with the human body of the wearer which comprises (a) swelling a shaped member of a silicone rubber with a volatilizable swelling agent and placing said swollen member on the portion of the frame, wherein the swelling agent is an organosilicon compound having a boiling point in the range from 20° to 200° C., and (b) removing the swelling agent by evaporation from the swollen shaped member of the silicone rubber to dryness whereby the shaped member shrinks to fit the portion of the frame tightly.

2. The method as claimed in claim 1 wherein the organosilicon compound is hexamethyldisiloxane.

3. The method as claimed in claim 1 wherein the silicone rubber has a hardness as dried in the range from 15 to 90 in the JIS scale.

* * * * *